(12) United States Patent
Wang et al.

(10) Patent No.: US 12,650,941 B2
(45) Date of Patent: Jun. 9, 2026

(54) METHOD AND RELATED APPARATUS FOR PCIE DATA TRANSMISSION

(71) Applicant: SUZHOU METABRAIN INTELLIGENT TECHNOLOGY CO., LTD., Suzhou (CN)

(72) Inventors: Hongliang Wang, Suzhou (CN); Shengcai Lu, Suzhou (CN); Qi Mou, Suzhou (CN); Wei Liu, Suzhou (CN); Deshan Zhang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/850,546

(22) PCT Filed: May 22, 2023

(86) PCT No.: PCT/CN2023/095595
§ 371 (c)(1),
(2) Date: Sep. 24, 2024

(87) PCT Pub. No.: WO2024/113704
PCT Pub. Date: Jun. 6, 2024

(65) Prior Publication Data
US 2025/0225091 A1    Jul. 10, 2025

(30) Foreign Application Priority Data
Nov. 29, 2022    (CN) .......................... 202211508023.4

(51) Int. Cl.
*G06F 13/28* (2006.01)
*G06F 13/20* (2006.01)

(52) U.S. Cl.
CPC ...... *G06F 13/28* (2013.01); *G06F 2213/0026* (2013.01)

(58) Field of Classification Search
CPC .......................... G06F 13/28; G06F 2213/0026
(Continued)

(56) References Cited

U.S. PATENT DOCUMENTS

| | | | |
|---|---|---|---|
| 5,642,489 A | 6/1997 | Bland et al. | |
| 7,143,206 B2 * | 11/2006 | Oda ........................ | G06F 13/28 |
| | | | 710/36 |

(Continued)

FOREIGN PATENT DOCUMENTS

| | | |
|---|---|---|
| CN | 102420763 A | 4/2012 |
| CN | 103685578 A | 3/2014 |

(Continued)

OTHER PUBLICATIONS

International Search Report issued for International Patent Application No. PCT/CN2023/095595 mailed Aug. 30, 2023 with English translation.

(Continued)

*Primary Examiner* — Chun Kuan Lee
(74) *Attorney, Agent, or Firm* — Merchant & Gould P.C.

(57) ABSTRACT

The present disclosure provides a method for PCIE data transmission. The method includes: determining whether the length of a PCIE data packet to be transmitted is less than a preset length; when it is determined that the length of the PCIE data packet is less than the preset length, performing data transmission on the PCIE data packet by means of a space of a base address register and a protocol converter; and when it is determined that the length of the PCIE data packet is greater than or equal to the preset length, performing data reading/writing on the PCIE data packet in a DMA manner. Therefore, the utilization rate of a PCIE bandwidth is improved, and the running reliability of a host is improved.

15 Claims, 4 Drawing Sheets

(58) Field of Classification Search
USPC ........................................................... 710/22
See application file for complete search history.

(56)                    References Cited

U.S. PATENT DOCUMENTS

| | | | | |
|---|---|---|---|---|
| 8,359,557 B1 * | 1/2013 | Chen | ..................... | G06F 30/327 |
| | | | | 716/101 |
| 2006/0136654 A1 * | 6/2006 | Franklin | ............... | G06F 3/0683 |
| | | | | 711/114 |
| 2017/0242623 A1 * | 8/2017 | Jung | ................... | G06F 12/0866 |
| 2022/0138140 A1 * | 5/2022 | Santan | ................ | G06F 15/7889 |
| | | | | 710/313 |

FOREIGN PATENT DOCUMENTS

| | | | |
|---|---|---|---|
| CN | 109471816 A | 3/2019 | |
| CN | 111045964 A | 4/2020 | |
| CN | 112131176 A | 12/2020 | |
| CN | 113868039 A | 12/2021 | |
| CN | 113986533 A | 1/2022 | |
| CN | 115240752 A | 10/2022 | |
| CN | 115328832 A | 11/2022 | |
| CN | 115543877 A | 12/2022 | |

OTHER PUBLICATIONS

Chinese Search Report received for CN Application No. 2022115080234, 2 pgs.

* cited by examiner

METHOD AND RELATED APPARATUS FOR PCIE DATA TRANSMISSION

CROSS-REFERENCE TO RELATED APPLICATION

The present application is a National Stage Application of PCT International Application No.: PCT/CN2023/095595 filed on Feb. 22, 2023, which claims priority to Chinese Patent Application 202211508023.4, filed in the China National Intellectual Property Administration on Nov. 29, 2022, the disclosure of which is incorporated herein by reference in its entirety.

TECHNICAL FIELD

The present disclosure relates to the technical field of computers, and in particular, to a method for PCIE data transmission, another method for PCIE data transmission, two apparatuses for PCIE data transmission, a computing device, and a non-transitory readable storage medium.

BACKGROUND

Peripheral component interconnect express (PCIE) is a common high-speed transfer protocol, and is generally used for data transmission between a host and various external devices, for example, a series of devices such as a PCIE interface, a network card, a graphics processing unit (GPU), and a field programmable gate array (FPGA), and a field programmable gate array. During communication between the PCIE and an external device, a direct memory access (DMA) technology is generally used to migrate data. During data migration, the central processing unit (CPU) grants the bus control permission to the DMA controller, and the DMA controller reports an interrupt to the CPU after completing data migration. This process can release the CPU pressure and improve the transmission efficiency.

In existing technology, generally, the DMA implementation mode is mainly divided into a block DMA and a chained DMA. However, in both the block DMA and the chained DMA, when small packets are transmitted, a bandwidth utilization rate is seriously reduced, which causes a great waste of performance. Furthermore, the frequent use of the DMA to transfer small data packets can also lead to a large number of interrupts to the CPU reception, which can easily cause the host to hang and reduce the stability of data transmission.

In existing technology, low bandwidth utilization rate and low operation reliability of a host are important issues of concern to by those skilled in the art.

SUMMARY

An objective of the present disclosure is to provide a method for PCIE data transmission, another method for PCIE data transmission, two apparatuses for PCIE data transmission, a computing device, and a non-transitory readable storage medium, so as to improve the PCIE bandwidth utilization rate and improve the running reliability of a host.

In order to solve the described technical problems, the present disclosure provides a method for PCIE data transmission, including:

determining whether the length of a PCIE data packet to be transmitted is less than a preset length;

when it is determined that the length of the PCIE data packet to be transmitted is less than the preset length, performing data transmission on the PCIE data packet by means of a space of a base address register and a protocol converter; and when it is determined that the length of the PCIE data packet to be transmitted is greater than or equal to the preset length, performing data reading/writing on the PCIE data packet in a DMA manner.

In an embodiment, performing data transmission on the PCIE data packet by means of the space of the base address register and the protocol converter includes:

when the PCIE data packet is for writing data, writing the PCIE data packet into a corresponding address by means of a space of a base address register;

when the PCIE data packet is for reading data, reading the PCIE data packet from a corresponding address by means of the space of the base address register.

In an embodiment, when the PCIE data packet is for writing data, writing the PCIE data packet into a corresponding address by means of a space of a base address register includes:

when the PCIE data packet is for writing data, writing the PCIE data packet into the space of the base address register;

placing the PCIE data packet in the space of the base address register into a writing data channel, and transmitting the PCIE data packet to a corresponding address by means of the writing data channel.

In an embodiment, when the PCIE data packet is for writing data, writing the PCIE data packet into the space of the base address register includes:

when the PCIE data packet is for writing data, configuring a corresponding address for a writing address channel; and writing the PCIE data packet into the space of the base address register.

In an embodiment, the method further includes:

reading the number of pieces of data in the space of the base address register; and when the number of pieces of data is zero, sending a data writing complete message.

In an embodiment, when the PCIE data packet is for reading data, reading the PCIE data packet from a corresponding address by means of the space of the base address register includes:

when the PCIE data packet is for reading data, controlling a reading address channel to acquire the PCIE data packet;

placing the PCIE data packet into the space of the base address register; and returning the PCIE data packet in the space of the base address register to a master device.

In an embodiment, when the PCIE data packet is for reading data, controlling a reading address channel to acquire the PCIE data packet includes:

when the PCIE data packet is for reading data, configuring the initial address and total length of the reading data; and controlling, on the basis of the initial address and total length of the reading data, the reading address channel to acquire the PCIE data packet.

In an embodiment, the method further includes:

reading the number of pieces of data in the space of the base address register; and when the number of pieces of data is zero, sending a data reading complete message.

In an embodiment, performing data reading/writing on the PCIE data packet in a block DMA manner includes:

performing data reading/writing on the PCIE data packet in a block DMA manner.

In an embodiment, performing data reading/writing on the PCIE data packet in a block DMA manner includes:

performing data reading/writing on the PCIE data packet in a chained DMA manner.

In an embodiment, determining whether the length of a PCIE data packet to be transmitted is less than a preset length includes:

determining whether the length of the PCIE data packet to be transmitted is less than the minimum packet length for DMA transmission.

In an embodiment, determining whether the length of a PCIE data packet to be transmitted is less than a preset length includes:

a FPGA device determining whether the length of a PCIE data packet to be transmitted is less than a preset length.

In an embodiment, the interface bus of the FPGA device is a standard AXI bus.

The present disclosure also provides a method for PCIE data transmission, including:

a master device sending a data transmission instruction to a slave device, so that the slave device determines whether the length of a PCIE data packet to be transmitted corresponding to the data transmission instruction is less than a preset length; when it is determined that the length of the PCIE data packet is less than the preset length, performing data transmission on the PCIE data packet by using a space of a base address register and a protocol converter; when it is determined that the length of the PCIE data packet is greater than or equal to the preset length, performing data reading/writing on the PCIE data packet by means of DMA; and returning a transmission complete message;

receiving the transmission complete message.

The present disclosure also provides an apparatus for PCIE data transmission, including:

a packet length determination module, configured to determine whether the length of a PCIE data packet to be transmitted is less than a preset length;

a small data packet transmission module, configured to perform data transmission on the PCIE data packet by means of a space of a base address register and a protocol converter when it is determined that the length of the PCIE data packet is less than the preset length; and a big data packet transmission module, configured to perform data reading/writing on the PCIE data packet in a DMA manner when it is determined that the length of the PCIE data packet is greater than and equal to the preset length.

The present disclosure also provides an apparatus for PCIE data transmission, including:

a transmission instruction sending module, configured to send a data transmission instruction to a slave device, so that the slave device determines whether the length of a PCIE data packet to be transmitted corresponding to the data transmission instruction is less than a preset length; when the slave device determines that the length of the PCIE data packet corresponding to the data transmission instruction is less than the preset length, perform data transmission on the PCIE data packet by using a space of a base address register and a protocol converter; when the slave device determines that the length of the PCIE data packet corresponding to the data transmission instruction is greater than or equal to the preset length, perform data reading/writing on the PCIE data packet by means of DMA; and return a transmission complete message;

a transmission complete module, configured to receive the transmission complete message.

The present disclosure also provides a PCIE external device, including:

a PCIE communication module, configured to implement a physical link layer and a protocol layer which are used for communication with a host;

a bus protocol interconnect module configured for interconnection between buses;

a protocol conversion module, configured to convert reading and writing data of a space of a base address register into a DMA reading and writing data interface;

a storage control interface module, configured to convert a storage interface into a standard axi bus interface.

In an embodiment, the protocol conversion module includes:

a register control module, arranged to configure the space of the base address register;

a writing control module, configured to control a writing address channel and a writing response channel, and place data in the space of the base address register into a writing data channel; and a reading control module, configured to control a reading address channel and place data in the reading data channel into the space of the base address register.

The present disclosure further provides a computing device, including:

a memory, configured to store a computer program;

a processor, configured to implement the steps of the described method for PCIE data transmission when executing the computer program.

The present disclosure further provides a non-transitory readable storage medium, wherein the non-transitory readable storage medium stores a computer program, and when the computer program is executed by a processor, the steps of the described method for PCIE data transmission are implemented.

The present disclosure provides a method for PCIE data transmission, including: determining whether the length of a PCIE data packet to be transmitted is less than a preset length; when it is determined that the length of the PCIE data packet is less than the preset length, performing data transmission on the PCIE data packet by means of a space of a base address register and a protocol converter; and when it is determined that the length of the PCIE data packet is greater than or equal to the preset length, performing data reading/writing on the PCIE data packet in a DMA manner.

It is determined firstly whether the length of a PCIE data packet to be transmitted is less than a preset length, and in the case that it is less than the preset length, then it indicates that the data packet is a small data packet, the PCIE data packet is transmitted by means of the space of the base address register instead of being transmitted in the DMA manner, and in the case that the length of the small data packet is greater than the preset length, data reading/writing is performed on the PCIE data packet in a DMA manner, so that data transmission is implemented for the small data packet in a non-DMA manner, thereby avoiding the problems existing when using the DMA manner, improving the data transmission efficiency, and reducing the problems caused by multiple and large DMA requests. The stability of transmission is improved.

The present disclosure further provides another method for PCIE data transmission, two apparatus for PCIE data transmission, a computing device, and a non-transitory readable storage medium, which have the foregoing beneficial effects and are not described herein again.

BRIEF DESCRIPTION OF THE DRAWINGS

To describe the technical solutions in the embodiments of present disclosure or in the existing technology more clearly, the following briefly describes the accompanying drawings required for describing the embodiments or the existing technology. Apparently, the accompanying drawings in the following description show merely some embodiments of the present disclosure, and a person of ordinary skill in the art may still derive other embodiments from these accompanying drawings without creative efforts.

DETAILED DESCRIPTION OF THE EMBODIMENTS

The core of the present disclosure is to provide a method for PCIE data transmission, another method for PCIE data transmission, two apparatus for PCIE data transmission, a computing device, and a non-transitory readable storage medium, so as to improve the PCIE bandwidth utilization rate and improve the running reliability of a host.

To make the objects, technical solutions, and advantages of the embodiments of the present disclosure clearer, hereinafter, the technical solutions in the embodiments of the present disclosure will be described clearly and thoroughly with reference to the accompanying drawings of the embodiments of the present disclosure. Obviously, the embodiments as described are some of the embodiments of the present disclosure, and are not all of the embodiments of the present disclosure. All other embodiments obtained by those of ordinary skill in the art on the basis of the embodiments in the disclosure without creative work shall fall within the scope of protection of the disclosure.

In existing technology, the DMA implementation mode is mainly divided into a block DMA and a chained DMA. However, in both the block DMA and the chained DMA, when small packets are transmitted, a bandwidth utilization rate is seriously reduced, which causes a great waste of performance. Furthermore, the frequent use of the DMA to transfer small data packets can also lead to the a large number of interrupts to the CPU reception, which can easily cause the host to hang and reduce the stability of data transmission.

Therefore, the embodiments of the present disclosure provide a method for PCIE data transmission. It is determined firstly whether the length of a PCIE data packet to be transmitted is less than a preset length, and in the case that it is less than the preset length, then it indicates that the data packet is a small data packet, the PCIE data packet is transmitted by means of the space of the base address register instead of being transmitted in the DMA manner, and in the case that the length of the small data packet is greater than the preset length, data reading/writing is performed on the PCIE data packet in a DMA manner, so that data transmission is implemented for the small data packet in a non-DMA manner, thereby avoiding the problems existing when using the DMA manner, improving the data transmission efficiency, and reducing the problems caused by multiple and large DMA requests. The stability of transmission is improved.

A method for PCIE data transmission provided in an embodiment of the present disclosure is illustrated as follows by using an embodiment.

Figure 1:
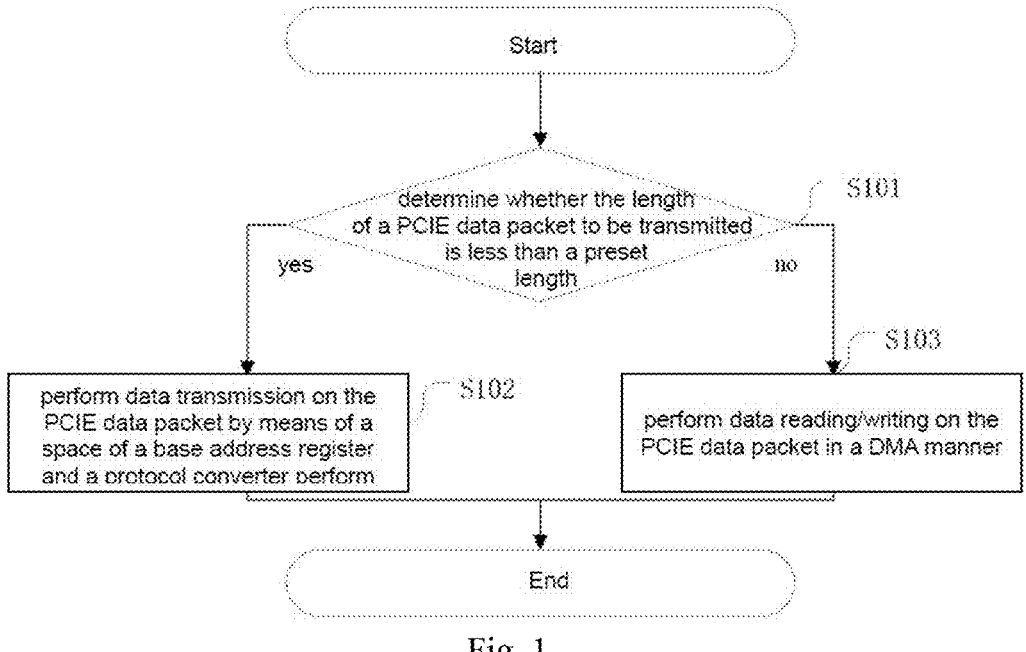
FIG. 1 is a flowchart of a method for PCIE data transmission according to an embodiment of the present disclosure.

Please refer to FIG. 1, FIG. 1 is a flowchart of a method for PCIE data transmission according to an embodiment of the present disclosure.

In this embodiment, the method may include:

S101, determining whether the length of a PCIE data packet to be transmitted is less than a preset length.

This step aims to determine whether the length of a PCIE data packet to be transmitted is less than a preset length. That is, it is determined whether the PCIE data packet is a small data packet.

The preset length may be set on the basis of the experience of a person skilled in the art, and may also be set on the basis of the size of a data packet in which there are a large number of requests in historical transmission data.

In an embodiment, this step may include:

determining whether the length of the PCIE data packet to be transmitted is less than the minimum packet length for DMA transmission.

Hence, this step may include determining whether the length of the PCIE data packet to be transmitted is less than the minimum packet length for DMA transmission. In the DMA transfer process, there is a process of transferring data according to a fixed data packet length. Therefore, there are a plurality of data packet sizes with different lengths, and the smallest packet length may be selected in this optional solution.

In an embodiment, this step may include:

a FPGA device determining whether the length of a PCIE data packet to be transmitted is less than a preset length.

Hence, this optional solution mainly describe that whether the length of a PCIE data packet to be transmitted is less than a preset length can be described by means of a FPGA device. A digital integrated circuit (IC) may also be used.

The interface bus of the FPGA device is a standard Advanced extensible Interface (AXI) bus.

S102, when it is determined that the length of the PCIE data packet is less than the preset length, data transmission is performed on the PCIE data packet by means of a space of a base address register and a protocol converter.

On the basis of S101, this step aims to perform data transmission on the PCIE data packet by means of the space of the base address register and the protocol converter. When the length of the data packet is less than the preset length, the PCIE data packet is transmitted by means of the space of the base address register and the protocol converter. That is, the data packet is transferred using the space of the base address register provided in the device.

The space of the base address register (BAR) is used for register configuration of a slave device.

Hence, by means of this step, small data can be directly transmitted by using the space of the base address register in a slave device, without using a DMA manner, thereby improving the efficiency of data transmission.

In an embodiment, this step may include:

S1021: when the PCIE data packet is for writing data, the PCIE data packet is written into a corresponding address by means of the space of the base address register.

S1022: when the PCIE data packet is for reading data, the PCIE data packet is read from a corresponding address by means of the space of the base address register.

Hence, this optional solution is mainly used for describing how to process different reading/writing situations. In the present optional solution, when the PCIE data packet is for writing data, the PCIE data packet is written into a corresponding address by means of the space of the base address register; and when the PCIE data packet is for reading data, the PCIE data packet is read from a corresponding address by means of the space of the base address register.

When data is written, the data is transmitted from the space of the base address register to a corresponding writing data channel. When data is read, the data is transmitted from the reading data channel to the space of the base address register. Hence, in this process, data is transferred by the space of the base address register, and data transmission does not need to be performed in a manner such as DMA.

In an embodiment, S1021 may include:

step 1: when the PCIE data packet is for writing data, the PCIE data packet is written into the space of the base address register; and step 2: the PCIE data packet in the space of the base address register is placed into a writing data channel, and the PCIE data packet is transmitted to a corresponding address by means of the writing data channel.

Hence, this optional solution is mainly used for describing how to writing data. In the present optional solution, when the PCIE data packet is for writing data, the PCIE data packet is written into the space of the base address register; the PCIE data packet in the space of the base address register is placed into a writing data channel, and the PCIE data packet is transmitted to a corresponding address by the writing data channel.

In an embodiment, step 1 in the previous optional solution may include:

step 1: when the PCIE data packet is for writing data, a corresponding address is configured for a writing address channel; and step 2: the PCIE data packet is written into the space of the base address register.

Hence, this optional solution is mainly used for describing how to writing data. In the present optional solution, when a PCIE data packet is for writing data, a corresponding address is configured for a writing address channel; the PCIE data packet is written into the space of the base address register.

In an embodiment, this embodiment can further include:

step 1: the number of pieces of data in the space of the base address register is read;

step 2: when the number of pieces of data is zero, a data writing complete message is sent.

Hence, this optional solution is mainly used to describe how to indicate data writing. In the present optional solution, the number of pieces of data in the space of the base address register is read; and when the number of pieces of data is zero, a data writing complete message is sent.

In an embodiment, S1022 may include:

step 1: when the PCIE data packet is for reading data, a reading address channel is controlled to acquire the PCIE data packet;

step 2: the PCIE data packet is placed into the space of the base address register;

step 3: the PCIE data packet in the space of the base address register is returned to a master device.

Hence, this optional solution is mainly used for describing how to read data. In the present optional solution, when the PCIE data packet is for reading data, the reading address channel is controlled to acquire the PCIE data packet; the PCIE data packet is placed into the space of the base address register; and the PCIE data packet in the space of the base address register is returned to the master device.

In an embodiment, step 1 in the previous optional solution may include:

step 1: when the PCIE data packet is for reading data, the initial address and total length of the reading data are configured;

step 2: on the basis of the initial address and total length of the reading data, the reading address channel is controlled to acquire the PCIE data packet.

Hence, this optional solution is mainly used for describing how to read data. In the present optional solution, when the PCIE data packet is for reading data, the initial address and total length of the reading data are configured; and on the basis of the initial address and total length of the reading data, the reading address channel is controlled to acquire the PCIE data packet.

In an embodiment, this embodiment can further include:

step 1: the number of pieces of data in the space of the base address register is read;

step 2: when the number of pieces of data is zero, a data reading complete message is sent.

Hence, this optional solution is mainly used for describing how to indicate data reading. In the present optional solution, the number of pieces of data in the space of the base address register is read; and when the number of pieces of data is zero, a data reading complete message is sent.

S103: when the FPGA device determines that the length of the PCIE data packet to be transmitted is greater than or equal to the preset length, performing data reading/writing on the PCIE data packet in a DMA manner.

On the basis of S101, this step aims to perform data reading/writing on a PCIE data packet in a DMA manner. That is to say, data transmission is performed in a DMA manner in other cases, thereby avoiding multiple requests for small data packets.

In an embodiment, this step may include:

performing data reading/writing on the PCIE data packet in a block DMA mode.

Hence, in this optional solution, data reading/writing is performed on the PCIE data packet in a block DMA manner.

The process of the block DMA manner is that only one continuous physical memory block of the master device can be transmitted after each DMA request starts, and in the case that the next memory block is to be transmitted, it must reinitialize the memory, configure a DMA register, and restart the DMA.

In an embodiment, this step may include:

performing data reading/writing on the PCIE data packet in a chained DMA manner.

Hence, in this optional solution, data reading/writing is performed on the PCIE data packet in a chained DMA manner.

In a chained DMA manner, discrete physical memory blocks to be transmitted are described one by one by means of a plurality of descriptors to form a descriptor table, the address of a first descriptor is loaded into a descriptor base address register of the DMA, and then a DMA request is started, and the DMA can complete the transmission of n memory blocks once.

The described method for data transmission can be used for a PCIE external device provided in the present embodiment, including:

a PCIE communication module, configured to implement a physical link layer and a protocol layer which are used for communication with a host;

a bus protocol interconnect module configured for interconnection between buses;

a protocol conversion module, configured to convert reading and writing data of a space of a base address register into a DMA reading and writing data interface;

a storage control interface module, configured to convert a storage interface into a standard axi bus interface.

The protocol conversion module includes:

a register control module, arranged to configure the space of the base address register;

a writing control module, configured to control a writing address channel and a writing response channel, and place data in the space of the base address register into a writing data channel; and a reading control module, configured to control a reading address channel and place data in the reading data channel into the space of the base address register.

In conclusion, in the present embodiment, it is determined firstly whether the length of a PCIE data packet to be transmitted is less than a preset length, and in the case that it is less than the preset length, then it indicates that the data packet is a small data packet, the PCIE data packet is transmitted by means of the space of the base register instead of being transmitted in the DMA mode, and in the case that the length of the small data packet is greater than the preset length, data reading/writing is performed on the PCIE data packet in a DMA mode, so that data transmission is implemented for the small data packet in a non-DMA manner, thereby avoiding the problems existing when using the DMA mode, improving the data transmission efficiency, and reducing the problems caused by multiple and large DMA requests. The stability of transmission is improved.

A method for PCIE data transmission provided in an embodiment of the present disclosure is described in details as follows by using another optional embodiment.

In this embodiment, the method may include:

S201, a master device sends a data transmission instruction to a slave device, so that the slave device determines whether the length of a PCIE data packet to be transmitted corresponding to the data transmission instruction is less than a preset length; when the slave device determines that the length of the PCIE data packet corresponding to the data transmission instruction is less than the preset length, performs data transmission on the PCIE data packet by using a space of a base register and a protocol converter; when the slave device determines that the length of the PCIE data packet corresponding to the data transmission instruction is greater than or equal to the preset length, performs data reading/writing on the PCIE data packet by means of DMA; and returns a transmission complete message; and S202, the transmission complete message is received.

Hence, in the present embodiment, it is determined firstly whether the length of a PCIE data packet to be transmitted is less than a preset length, and in the case that it is less than the preset length, then it indicates that the data packet is a small data packet, the PCIE data packet is transmitted by means of the space of the base register instead of being transmitted in the DMA mode, and in the case that the length of the small data packet is greater than the preset length, data reading/writing is performed on the PCIE data packet in a DMA mode, so that data transmission is implemented for the small data packet in a non-DMA manner, thereby avoiding the problems existing when using the DMA mode, improving the data transmission efficiency, and reducing the problems caused by multiple and large DMA requests. The stability of transmission is improved.

A method for PCIE data transmission provided in an embodiment of the present disclosure is described in details as follows by using another optional embodiment.

Figure 2:
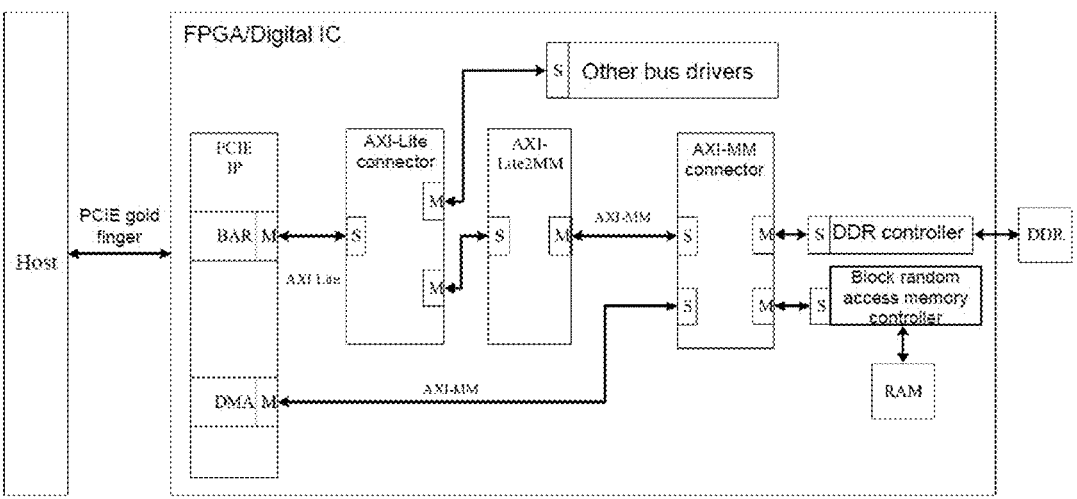
FIG. 2 is a system block diagram of a method for PCIE data transmission according to an embodiment of the present disclosure.

Please refer to FIG. 2, FIG. 2 is a system block diagram of a method for PCIE data transmission according to an embodiment of the present disclosure.

In the present embodiment, an FPGA/digital IC device having a PCIE interface should be mainly configured to communicate with a host, so as to improve the PCIE transmission efficiency when the data volume is lower than 1024B, and to take account of transmission efficiency of a large data volume at the same time, that is to say, the present design is responsible for transmission of packet with a data volume lower than 1024B, and a DMA transmission manner is still used for a data packet larger than 1024B. In order to achieve maximum compatibility, in the present embodiment, the bus interface is unified at the device end for two manners.

As shown in FIG. 2, PCIE IP is a physical link layer and a protocol layer which are used for communication between an FPGA/digital IC and a host, further includes a BAR space reading and writing mechanism and a DMA controller, and is responsible for various types of communications between the host and a PCIE of a device; the AXI-Lite Interconnect module and the AXI-MM Interconnect module are AXI protocol interconnect modules configured to be interconnected between buses, and the buses are divided into master nodes and slave nodes according to directions, in the figure, M represents master modes and S represents slave nodes; an AXI-Lite2MM module is a protocol conversion module, which converts an axi-lite interface into an axi-mm interface, and the purpose is to unify Bars pace register reading/writing data to a DMA read/writing data interface; a DDR controller and a RAM controller are storage control interface modules, and the purpose thereof is to convert a storage interface into a standard axi bus interface, so as to facilitate system integration. In addition, a Block Random Access Memory (Block RAM) controller is included.

Figure 3:
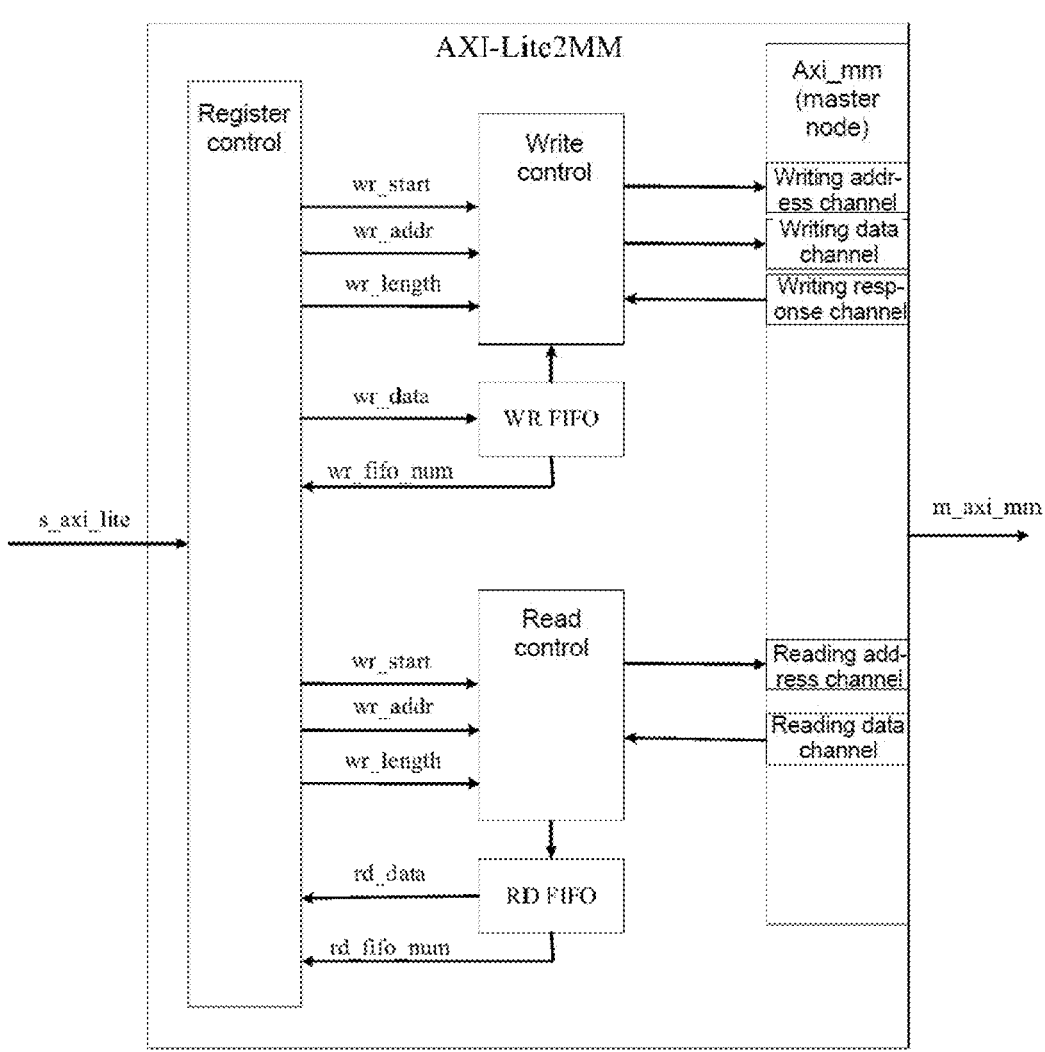
FIG. 3 is a schematic structural diagram of a protocol conversion module of a method for PCIE data transmission according to an embodiment of the present disclosure.

Please refer to FIG. 3, FIG. 3 is a schematic structural diagram of a protocol conversion module of a method for PCIE data transmission according to an embodiment of the present disclosure.

For the AXI-Lite2MM module, reference may be made to FIG. 3, wherein axi-mm is a master node, the register control module interface is an axi-lite bus, the bus is used for bar space configuration registers, and the registers defined by the module are as follows:

TABLE 1

Register Definition Table

| Address offset | Register | Access permission | Description |
|---|---|---|---|
| 0x0000 | Wr_start | WO (Write Only) | Used to enable a writing control module |
| 0x0004 | Wr_addr_h | R/w (Read/Write) | Axi-mm writing channel initial address: high 32-bit address, 64 bits in total |
| 0x0008 | Wr_addr_l | R | Axi-mm writing channel initial address: low 32-bit address, 64 bits in total |
| 0x000C | Wr-length | RW | The total length of Axi-mm writing data |
| 0x0010 | rd-start | WO | Used to enable a reading control module |
| 0x0014 | rd_addr_h | R/W | Axi-mm reading channel initial address: high 32-bit address, 64 bits in total |
| 0x0018 | rd_addr_l | RW | Axi-mm reading channel initial address: low 32-bit address, 64 bits in total |
| 0x001C | rd_length | RW | The total length of Axi-mm reading data |
| 0x0020 | Wr_data | WO | Use the register to write data into wr_fifo |
| 0x0024 | Rd_data | RO (Read Only) | Use the register to read data from rd_fifo |
| 0x0028 | Wr_fifo_num | RO (Read Only) | Indicate the current number of pieces of data written into wr_fifo |
| 0x002c | Rd_fifo_num | RO (Read Only) | Indicate the current number of pieces of data which can be read from rd_fifo |

The writing control module is mainly configured to control a writing address channel and a writing response channel, and place data in wr_fifo into the writing data channel. The reading control module is mainly configured to control a reading address channel and place data in the reading data channel intord_fifo.

Figure 4:
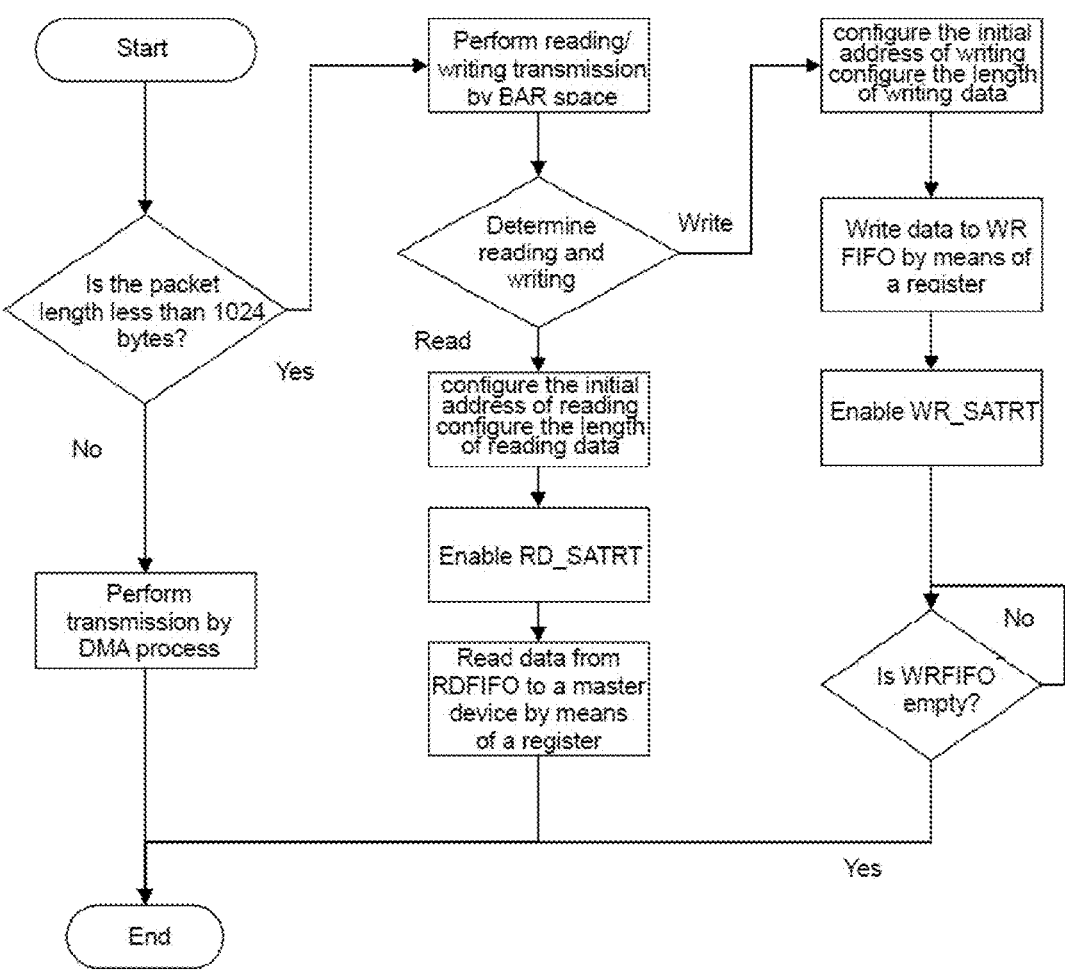
FIG. 4 is a flowchart of another method for PCIE data transmission according to an embodiment of the present disclosure.

Please refer to FIG. 4, FIG. 4 is a flowchart of another method for PCIE data transmission according to an embodiment of the present disclosure.

Based on the description of the foregoing modules, the data transmission process in the present embodiment may include:

step 1: it is determined whether the length of the packet is less than 1024B (byte), in the case that the length is greater than 1024B, a DMA procedure is executed to transfer data, and in the case that the length is less than 1024B, data is read, written and transmitted using a BAR space, i.e. executing step 2;

step 2: it is determined whether to read data or write data, in the case that it is the master device that writes data into the device, steps 3.1 to 3.4 are executed, and in the case that it is the master device that reads device data, steps 4.1 to 4.3 are executed;

step 3.1: a storage initial address, including high 32 bits and low 32 bits, written to a device is configured, and the total length of data to be written is configured;

step 3.2: the data of the master device is written into the WR_FIFO by means of the register WR_DATA, and every time the WR_DATA is written once, the corresponding data is written into the WR_FIFO;

step 3.3: a WR_START register is enabled, and a write control module places data in WR_FIFO into an AXI-MM bus until the data in WR_FIFO is written into a storage address corresponding to a device, and in this case, a writing address channel is also controlled to automatically accumulate an address and process a writing response, etc.

step 3.4: after WR_START is enabled, the number of pieces of data in WR_FIFO can be read by means of a Wr_fifo_num register, and when the number of pieces of data is zero, it indicates that all the data has been placed in the axi-mm bus, and the data writing ends;

step 4.1: an initial address, including high 32 bits and low 32 bits, for a slave device to store reading data is configured, and the total length of the data to be read is configured;

step 4.2: a WR_START register is enabled, a reading control module controls a reading address channel to automatically accumulate addresses, and read data on an AXI-MM bus, the AXI-MM bus returns correspondingly stored data of a device by means of the reading data channel, and the read control module writes the returned data into an RD_FIFO;

step 4.3: data in the RD_FIFO is returned to the master device by reading the RD_DATA register, and every time the RD_DATA register is read once, one piece of data is returned to the master device from the RD_FIFO, and the reading of data of a corresponding length ends; in addition, whether the reading is completed may be verified by means of the RD_fifo_num register.

The interface in the present embodiment uses a standard AXI bus to unify the design and DMA into an AXI-MM interface, thereby facilitating system-level integration, transplantation and maintenance. The transmission manner does not require a PCIE interrupt, thereby avoiding host hanging caused by a large number of reported interrupts. Meanwhile, when the data volume is lower than 1024B, the transmission efficiency is higher than that of pure DMA, and through experimental verification, when the transmission data volume is lower than 1024B, the bandwidth of this design is 1.5-20 times that of DMA transmission, and the smaller the data volume is, the higher the efficiency of this design is.

Furthermore, the bandwidth of the DMA transmission is unstable during transmission of a small amount of data, and the stability of the bandwidth during transmission of a small amount of data can be ensured by using this design.

The present embodiment does not mean discarding the DMA transmission manner, but performing supplementation on the DMA transmission manner, wherein the mode of reading and writing by the BAR space register is used in this design only when the transmission data is lower than 1024B, so as to overcome the problems in the DMA transmission manner of low bandwidth, unstable bandwidth and many reported interrupts in transmission of a small amount of data.

Hence, in the present embodiment, it is determined firstly whether the length of a PCIE data packet to be transmitted is less than a preset length, and in the case that it is less than the preset length, then it indicates that the data packet is a small data packet, the PCIE data packet is transmitted by means of the space of the base register instead of being transmitted in the DMA mode, and in the case that the length of the small data packet is greater than the preset length, data reading/writing is performed on the PCIE data packet in a DMA mode, so that data transmission is implemented for the small data packet in a non-DMA manner, thereby avoiding the problems existing when using the DMA mode, improving the data transmission efficiency, and reducing the problems caused by multiple and large DMA requests. The stability of transmission is improved.

An apparatus for PCIE data transmission provided in an embodiment of the present disclosure is introduced as follows. The apparatus for PCIE data transmission described below and the method for PCIE data transmission described above may be referenced correspondingly.

Figure 5:
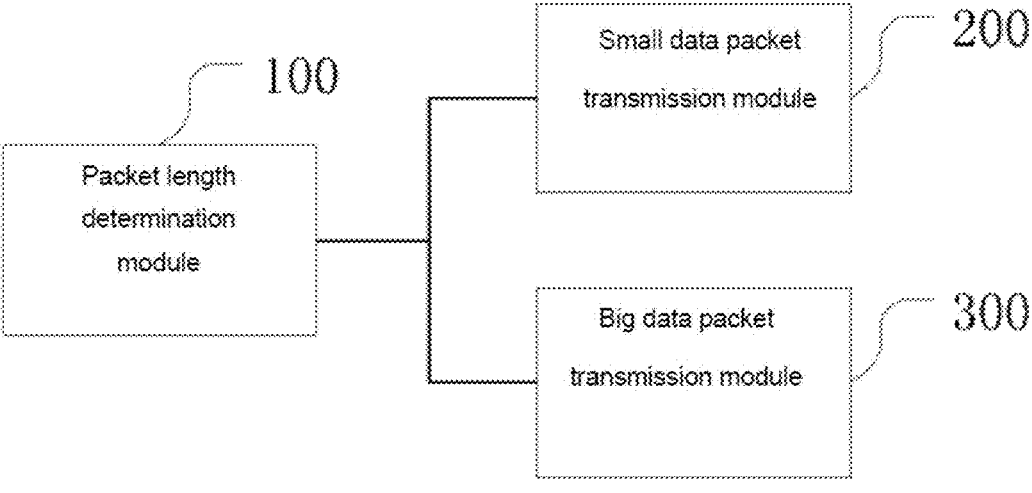
FIG. 5 is a schematic structural diagram of an apparatus for PCIE data transmission according to an embodiment of the present disclosure.

Please refer to FIG. 5, FIG. 5 is a schematic structural diagram of an apparatus for PCIE data transmission according to an embodiment of the present disclosure.

In the present embodiment, the device may include:

a packet length determination module 100, configured to determine whether the length of a PCIE data packet to be transmitted is less than a preset length;

a small data packet transmission module 200, configured to perform data transmission on the PCIE data packet by means of a space of a base address register and a protocol converter when it is determined that the length of the PCIE data packet is less than the preset length; and a big data packet transmission module 300, configured to perform data reading/writing on the PCIE data packet in a DMA manner when it is determined that the length of the PCIE data packet is greater than and equal to the preset length.

In an embodiment, the small data packet transmission module 200 may include:

a data writing unit, configured to write the PCIE data packet into a corresponding address by means of a space of a base register when the PCIE data packet is for writing data; and a data reading unit, configured to read the PCIE data packet from a corresponding address by means of the space of the base register when the PCIE data packet is reading data.

In an embodiment, the data writing unit is configured to write the PCIE data packet into the space of the base address register when the PCIE data packet is writing data; place the PCIE data packet in the space of the base address register into a writing data channel, and transmit the PCIE data packet to a corresponding address by means of the writing data channel.

In an embodiment, when the PCIE data packet is for writing data, writing the PCIE data packet into the space of the base register may include:

when the PCIE data packet is for writing data, configuring a corresponding address for a writing address channel; and writing the PCIE data packet into the space of the base address register.

In an embodiment, the data writing unit further includes:

a data writing complete unit, configured to read the number of pieces of data in the space of the base address register; and send a data writing complete message when the number of pieces of data is zero.

In an embodiment, the data reading unit is configured to control, when the PCIE data packet is for reading data, a reading address channel to acquire the PCIE data packet; place the PCIE data packet into the space of the base address register; and return the PCIE data packet in the space of the base address register to a master device.

In an embodiment, when the PCIE data packet is for reading data, controlling a reading address channel to acquire the PCIE data packet includes:

when the PCIE data packet is for reading data, configuring the initial address and total length of the reading data; and controlling, on the basis of the initial address and total length of the reading data, the reading address channel to acquire the PCIE data packet.

In an embodiment, the data reading unit further includes:

a data reading complete unit, configured to read the number of pieces of data in the space of the base address register; and send a data reading complete message when the number of pieces of data is zero.

In an embodiment, the big data packet transmission module 300 is configured to perform data reading/writing on the PCIE data packet in a block DMA manner.

In an embodiment, the big data packet transmission module 300 is configured to perform data reading/writing on the PCIE data packet in a chained DMA manner.

In an embodiment, the packet length determination module 100 is configured to determine whether the length of the PCIE data packet to be transmitted is less than the minimum packet length for DMA transmission.

In the present embodiment, also provided is another apparatus for PCIE data transmission, which may include:

a transmission instruction sending module, configured to send a data transmission instruction to a slave device, so that the slave device determines whether the length of a PCIE data packet to be transmitted corresponding to the data transmission instruction is less than a preset length; when the slave device determines that the length of the PCIE data packet corresponding to the data transmission instruction is less than the preset length, perform data transmission on the PCIE data packet by using a space of a base address register and a protocol converter; when the slave device determines that the length of the PCIE data packet corresponding to the data transmission instruction is greater than or equal to the preset length, perform data reading/writing on the PCIE data packet by means of DMA; and return a transmission complete message;

a transmission complete module, configured to receive the transmission complete message.

Hence, in the present embodiment, it is determined firstly whether the length of a PCIE data packet to be transmitted is less than a preset length, and in the case that it is less than the preset length, then it indicates that the data packet is a small data packet, the PCIE data packet is transmitted by means of the space of the base register instead of being transmitted in the DMA mode, and in the case that the length of the small data packet is greater than the preset length, data reading/writing is performed on the PCIE data packet in a DMA mode, so that data transmission is implemented for the small data packet in a non-DMA manner, thereby avoiding the problems existing when using the DMA mode, improving the data transmission efficiency, and reducing the problems caused by multiple and large DMA requests. The stability of transmission is improved.

Figure 6:
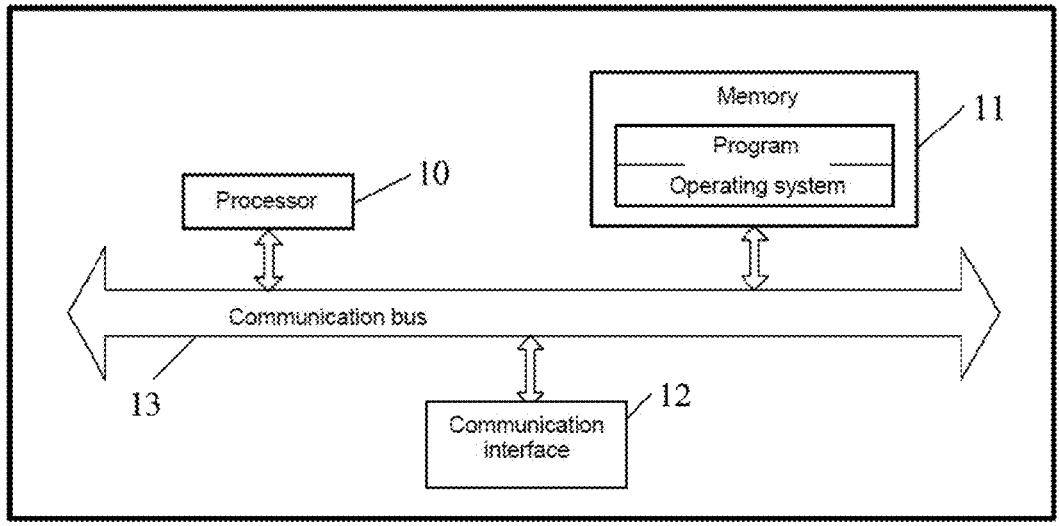
FIG. 6 is a schematic structural diagram of a computing device according to an embodiment of the present disclosure.

An embodiment of the present disclosure also provides a computing device. Please refer to FIG. 6. FIG. 6 is a schematic structural diagram of a computing device according to an embodiment of the present disclosure. The computing device may include:

a memory, configured to store a computer program;

a processor, configured to implement the steps of the described method for PCIE data transmission when executing the computer program.

FIG. 6 is a schematic structural diagram of a computing device. The computing device may include: a processor 10, a memory 11, a communication interface 12, and a communication bus 13. The processor 10, the memory 11, and the communication interface 12 all communicate with each other by using the communication bus 13.

In the embodiment of the present disclosure, the processor 10 may be a central processing unit (CPU), a specific disclosure integrated circuit, a digital signal processor, a field programmable gate array, or other programmable logic devices.

The processor 10 may call a program stored in the memory 11. In an embodiment, the processor 10 may execute operations in the embodiment of the anomalous IP identification method.

The memory 11 is configured to store one or more programs, wherein the programs may include program codes which include computer operation instructions. In the embodiments of the present disclosure, the memory 11 at least stores a program configured to implement the following functions:

determining whether the length of a PCIE data packet to be transmitted is less than a preset length;

when it is determined that the length of the PCIE data packet is less than the preset length, performing data transmission on the PCIE data packet by means of a space of a base address register and a protocol converter; and when it is determined that the length of the PCIE data packet is greater than or equal to the preset length, performing data reading/writing on the PCIE data packet in a DMA manner.

In one possible implementation, the memory 11 may include a program storage area and a data storage area, wherein the program storage area may store an operating system, an application program required by at least one function, etc.; the data storage area may store data created during use.

In addition, the memory 11 may include a high-speed random access memory, and can further include a non-transitory memory, for example, at least one magnetic disk storage device or another transitory solid state storage device.

The communication interface 12 may be an interface of the communication module, and is configured to connect to other devices or systems.

It should be noted that the structure shown in FIG. 6 does not limit the computing device in the embodiment of the present disclosure, and in practical applications, the computing device may include more or less components than those shown in FIG. 6, or may combine some components.

The embodiments of the present disclosure further provide a non-transitory readable storage medium, wherein the non-transitory readable storage medium stores a computer program, and when the computer program is executed by a processor, the steps of any one of the described method for PCIE data transmission are implemented.

The non-transitory readable storage medium may include any medium that can store program codes, such as a USB flash disk, a removable hard disk, a read-only memory (ROM), a random access memory (RAM), a magnetic disk, or an optical disk.

For the description of the non-transitory computer-readable storage medium provided in the embodiment of the present disclosure, reference may be made to the foregoing method embodiments, and details are not repeatedly described in the embodiment of the present disclosure.

The embodiments in this description are described in a progressive manner. Each embodiment focuses on differences from other embodiments. For the same similar parts among the embodiments, reference may be made to each other. For the apparatus disclosed in the embodiment, as the apparatus corresponds to the method disclosed in the embodiment, the illustration thereof is relatively simple, and for the relevant parts, reference can be made to the illustration of the method part.

A person skilled in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular disclosure, but it should not be considered that the implementation goes beyond the scope of the embodiments of the present disclosure.

In combination with embodiments disclosed in this specification, method or algorithm steps may be implemented by hardware, a software module executed by a processor, or a combination thereof. The software module may be provided in a random access memory (RAM), a memory, a read-only memory (ROM), an electrically programmable ROM, an electrically erasable programmable ROM, a register, a hard disk, a removable magnetic disk, a CD-ROM, or any other form of non-transitory readable storage medium known in the art.

The foregoing describes in details the method for PCIE data transmission, another method for PCIE data transmission, two apparatus for PCIE data transmission, the computing device, and the non-transitory readable storage medium according to the embodiments of the present disclosure. Optional examples have been applied herein to illustrate the principle and implementations of the embodiments of the present disclosure, and the description of the above embodiments is only used to help understand the method and core concept of the embodiments of the present disclosure. It should be noted that for a person of ordinary skill in the present technical field, several improvements and modifications can also be made to the embodiments of the present disclosure without departing from the principle of the embodiments of the present disclosure, and these improvements and modifications shall fall within the scope of protection of the claims of the embodiments of the present disclosure.

What is claimed is:

1. A method for PCIE data transmission, comprising:

determining whether the length of a PCIE data packet to be transmitted is less than a preset length;

when it is determined that the length of the PCIE data packet to be transmitted is less than the preset length, performing data transmission on the PCIE data packet by means of a space of a base address register and a protocol converter; and when it is determined that the length of the PCIE data packet to be transmitted is greater than or equal to the preset length, performing data reading/writing on the PCIE data packet in a DMA manner;

wherein performing data transmission on the PCIE data packet by means of a space of a base address register and a protocol converter comprises: when the PCIE data packet is data to be written, writing the PCIE data packet into a corresponding address by means of the space of the base address register; and when the PCIE data packet is data to be read, reading the PCIE data packet from a corresponding address by means of the space of the base address register;

wherein when the PCIE data packet is data to be written, writing the PCIE data packet into a corresponding address by means of the space of the base address register comprises: when the PCIE data packet is data to be written, writing the PCIE data packet into the space of the base address register; and placing the PCIE data packet in the space of the base address register into a writing data channel, and transmitting the PCIE data packet to a corresponding address by means of the writing data channel;

wherein when the PCIE data packet is data to be read, reading the PCIE data packet from the corresponding address by means of the space of the base address register comprises: when the PCIE data packet is data to be read, controlling a reading address channel to acquire the PCIE data packet;

placing the PCIE data packet into the space of the base address register; and returning the PCIE data packet in the space of the base address register to a master device;

wherein the controlling a reading address channel to acquire the PCIE data packet, placing the PCIE data packet into the space of the base address register, and returning the PCIE data packet in the space of the base address register to a master device, comprising: controlling, by means of a reading control module in an AXI-Lite2MM module, the reading address channel to automatically accumulate addresses so as to read data on an AXI-MM bus, and writing the data returned by means of the reading address channel into a RD_FIFO by means of the reading control module; returning data in the RD_FIFO to the master device by reading a RD_DATA register, wherein every time the RD_DATA register is read once, one piece of data is returned to the master device from the RD_FIFO;

wherein the protocol converter comprises the AXI-Lite2MM module, the AXI-Lite2MM module is configured to convert an axi-lite interface into an axi-mm interface.

2. The method for PCIE data transmission according to claim 1, wherein when the PCIE data packet is data to be written, writing the PCIE data packet into the space of the base address register comprises:

when the PCIE data packet is data to be written, configuring a corresponding address for a writing address channel; and writing the PCIE data packet into the space of the base address register.

3. The method for PCIE data transmission according to claim 1, further comprising:

reading the number of pieces of data in the space of the base address register; and when the number of pieces of data is zero, sending a data writing complete message.

4. The method for PCIE data transmission according to claim 1, wherein when the PCIE data packet is data to be read, controlling a reading address channel to acquire the PCIE data packet comprises:

when the PCIE data packet is data to be read, configuring the initial address and total length of the reading data; and controlling, on the basis of the initial address and the total length of the reading data, the reading address channel to acquire the PCIE data packet.

5. The method for PCIE data transmission according to claim 1, further comprising:

reading the number of pieces of data in the space of the base address register; and when the number of pieces of data is zero, sending a data reading complete message.

6. The method for PCIE data transmission according to claim 1, wherein performing data reading/writing on the PCIE data packet in a DMA manner comprises:

performing data reading/writing on the PCIE data packet in a block DMA manner.

7. The method for PCIE data transmission according to claim 1, wherein performing data reading/writing on the PCIE data packet in a DMA manner comprises:

performing data reading/writing on the PCIE data packet in a chained DMA manner.

8. The method for PCIE data transmission according to claim 1, wherein determining whether the length of a PCIE data packet to be transmitted is less than a preset length comprises:

determining whether the length of the PCIE data packet to be transmitted is less than the minimum packet length for DMA transmission.

9. The method for PCIE data transmission according to claim 1, wherein determining whether the length of a PCIE data packet to be transmitted is less than a preset length comprises:

a FPGA device determining whether the length of the PCIE data packet to be transmitted is less than the preset length.

10. The method for PCIE data transmission according to claim 9, wherein an interface bus of the FPGA device is a standard AXI bus.

11. A method for PCIE data transmission, comprising:

sending, by a master device, a data transmission instruction to a slave device, so that the slave device determines whether the length of a PCIE data packet to be transmitted corresponding to the data transmission instruction is less than a preset length; when the slave device determines that the length of the PCIE data packet corresponding to the data transmission instruction is less than the preset length, performing data transmission on the PCIE data packet by using a space of a base address register and a protocol converter; when the slave device determines that the length of the PCIE data packet corresponding to the data transmission instruction is greater than or equal to the preset length, performing data reading/writing on the PCIE data packet by means of DMA; and returning a transmission complete message; and receiving the transmission complete message;

wherein performing data transmission on the PCIE data packet by means of a space of a base address register and a protocol converter comprises: when the PCIE data packet is data to be written, writing the PCIE data packet into a corresponding address by means of the space of the base address register; and when the PCIE data packet is data to be read, reading the PCIE data packet from a corresponding address by means of the space of the base address register;

wherein when the PCIE data packet is data to be written, writing the PCIE data packet into a corresponding address by means of the space of the base address register comprises: when the PCIE data packet is data to be written, writing the PCIE data packet into the space of the base address register; and placing the PCIE data packet in the space of the base address register into a writing data channel, and transmitting the PCIE data packet to a corresponding address by means of the writing data channel;

wherein when the PCIE data packet is data to be read, reading the PCIE data packet from the corresponding address by means of the space of the base address register comprises: when the PCIE data packet is data to be read, controlling a reading address channel to acquire the PCIE data packet; placing the PCIE data packet into the space of the base address register; and returning the PCIE data packet in the space of the base address register to a master device;

wherein the controlling a reading address channel to acquire the PCIE data packet, placing the PCIE data packet into the space of the base address register, and returning the PCIE data packet in the space of the base address register to a master device, comprising: controlling, by means of a reading control module in an AXI-Lite2MM module, the reading address channel to automatically accumulate addresses so as to read data on an AXI-MM bus, and writing the data returned by means of the reading address channel into a RD_FIFO by means of the reading control module; returning data in the RD_FIFO to the master device by reading a RD_DATA register, wherein every time the RD_DATA register is read once, one piece of data is returned to the master device from the RD_FIFO;

wherein the protocol converter comprises the AXI-Lite2MM module, the AXI-Lite2MM module is configured to convert an axi-lite interface into an axi-mm interface.

12. The method for PCIE data transmission according to claim 11, wherein when the PCIE data packet is data to be written, writing the PCIE data packet into the space of the base address register comprises:

when the PCIE data packet is data to be written, configuring a corresponding address for a writing address channel; and writing the PCIE data packet into the space of the base address register.

13. The method for PCIE data transmission according to claim 11, further comprising:

reading the number of pieces of data in the space of the base address register; and when the number of pieces of data is zero, sending a data writing complete message.

14. A computing device, comprising:

a memory, configured to store a computer program;

a processor, configured to implement the steps of the method for PCIE data transmission according to claim 1 when executing the computer program.

15. A non-transitory computer readable storage medium storing computer program that, when executed by a processor, causes the processor to:

determine whether the length of a PCIE data packet to be transmitted is less than a preset length;

when it is determined that the length of the PCIE data packet to be transmitted is less than the preset length, perform data transmission on the PCIE data packet by means of a space of a base address register and a protocol converter; and when it is determined that the length of the PCIE data packet to be transmitted is greater than or equal to the preset length, perform data reading/writing on the PCIE data packet in a DMA manner;

wherein performing data transmission on the PCIE data packet by means of a space of a base address register and a protocol converter comprises: when the PCIE data packet is data to be written, writing the PCIE data packet into a corresponding address by means of the space of the base address register; and when the PCIE data packet is data to be read, reading the PCIE data packet from a corresponding address by means of the space of the base address register;

wherein when the PCIE data packet is data to be written, writing the PCIE data packet into a corresponding address by means of the space of the base address register comprises: when the PCIE data packet is data to be written, writing the PCIE data packet into the space of the base address register; and placing the PCIE data packet in the space of the base address register into a writing data channel, and transmitting the PCIE data packet to a corresponding address by means of the writing data channel;

wherein when the PCIE data packet is data to be read, reading the PCIE data packet from the corresponding address by means of the space of the base address register comprises: when the PCIE data packet is data to be read, controlling a reading address channel to acquire the PCIE data packet; placing the PCIE data packet into the space of the base address register; and returning the PCIE data packet in the space of the base address register to a master device;

wherein the controlling a reading address channel to acquire the PCIE data packet, placing the PCIE data packet into the space of the base address register, and returning the PCIE data packet in the space of the base address register to a master device, comprising: controlling, by means of a reading control module in an AXI-Lite2MM module, the reading address channel to automatically accumulate addresses so as to read data on an AXI-MM bus, and writing the data returned by means of the reading address channel into a RD_FIFO by means of the reading control module; returning data in the RD_FIFO to the master device by reading a RD_DATA register, wherein every time the RD_DATA register is read once, one piece of data is returned to the master device from the RD_FIFO;

wherein the protocol converter comprises the AXI-Lite2MM module, the AXI-Lite2MM module is configured to convert an axi-lite interface into an axi-mm interface.

* * * * *